(12) United States Patent
Venkataraman et al.

(10) Patent No.: US 7,736,777 B2
(45) Date of Patent: Jun. 15, 2010

(54) CONTROL ASSEMBLY FOR CONTROLLING A FUEL CELL SYSTEM DURING SHUTDOWN AND RESTART

(75) Inventors: Ramki Venkataraman, New Milford, CT (US); George Berntsen, Shelton, CT (US); Glenn L. Carlson, Bethlehem, CT (US); Mohammad Farooque, Danbury, CT (US); Dan Beachy, Gales Ferry, CT (US); Stefan Peterhans, Gaissach (DE); Manfred Bischoff, Feldkirchen (DE)

(73) Assignees: FuelCell Energy, Inc., Danbury, CT (US); MTU CFC Solutions GmbH, Ottobrunn (DE)

( * ) Notice: Subject to any disclaimer, the term of this patent is extended or adjusted under 35 U.S.C. 154(b) by 1343 days.

(21) Appl. No.: 11/202,010

(22) Filed: Aug. 11, 2005

(65) Prior Publication Data

US 2007/0037025 A1 Feb. 15, 2007

(51) Int. Cl.
*H01M 8/04* (2006.01)
*H01M 8/00* (2006.01)
(52) U.S. Cl. .............................. 429/22; 429/12; 429/13; 429/17
(58) Field of Classification Search ....................... None
See application file for complete search history.

(56) References Cited

U.S. PATENT DOCUMENTS 4,820,594 A * 4/1989 Sugita et al. .................. 429/17

6,277,508 B1 * 8/2001 Reiser et al. .................. 429/17
2003/0087138 A1 * 5/2003 Margiott et al. ............... 429/17
2004/0229102 A1 * 11/2004 Jahnke et al. .................. 429/34

FOREIGN PATENT DOCUMENTS

WO WO 2005/043662 A1 * 5/2005

* cited by examiner

*Primary Examiner*—Dah-Wei D Yuan
*Assistant Examiner*—Adam A Arciero
(74) *Attorney, Agent, or Firm*—Cowan, Liebowitz & Latman, PC (57) ABSTRACT

A fuel cell system and method in which the fuel cell system receives and an input oxidant gas and an input fuel gas, and in which a fuel processing assembly is provided and is adapted to at least humidify the input fuel gas which is to be supplied to the anode of the fuel cell of the system whose cathode receives the oxidant input gas via an anode oxidizing assembly which is adapted to couple the output of the anode of the fuel cell to the inlet of the cathode of the fuel cell during normal operation, shutdown and restart of the fuel cell system, and in which a control assembly is further provided and is adapted to respond to shutdown of the fuel cell system during which input fuel gas and input oxidant gas cease to be received by the fuel cell system, the control assembly being further adapted to, when the fuel cell system is shut down: control the fuel cell system so as to enable a purging gas to be able to flow through the fuel processing assembly to remove humidified fuel gas from the processing assembly and to enable a purging gas to be able to flow through the anode of the fuel cell.

30 Claims, 4 Drawing Sheets

FIG. 4B

CONTROL ASSEMBLY FOR CONTROLLING A FUEL CELL SYSTEM DURING SHUTDOWN AND RESTART

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to fuel cell systems and, in particular, to control assemblies for controlling fuel cell systems during shutdown and restart.

A fuel cell is a device, which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

A molten carbonate fuel cell ("MCFC") system operates by passing a reactant fuel gas through the anode of the fuel cell of the fuel cell system, while an oxidizing gas is passed through the cathode of the fuel cell of the fuel cell system. The fuel supplied to the MCFC system is typically a hydrocarbon fuel which needs to be humidified, usually by adding vaporized water or steam, before the fuel enters the anode of the fuel cell. During MCFC operation, the oxidizing gas keeps the cathode of the fuel cell in an oxidizing atmosphere, while the humidified fuel gas keeps the anode of the fuel cell in a reducing atmosphere.

When the MCFC system is shut down, i.e., when the fuel cell is at its operating temperature and the fuel and oxidant gases are no longer supplied to the system, a number of things must occur to protect the system. First, the oxidizing atmosphere must be maintained in the cathode of the fuel cell and the reducing atmosphere must be maintained in the anode of the fuel cell. Second, the humidified fuel present in the fuel lines of the MCFC system needs to be purged in order to prevent condensation, possible Nickel Carbonyl formation and damage to the catalysts in the fuel cell by liquid water.

When the MCFC system is restarted, i.e., when the flows are reestablished after a shutdown, again certain conditions must be present to ensure continued system operation. During restart, the oxidant flow is established before initiation of the fuel flow. Thus, a reducing atmosphere needs to be maintained in the anode of the fuel cell during the time when the regular fuel flow is not available to prevent oxidation of the anode. Additionally, during this time, carbon dioxide needs to be supplied both to the anode gas stream and to the cathode of the fuel cell. This is needed in order to prevent decomposition of the fuel cell electrolyte as well as to prevent fuel cell matrix particle growth at the matrix anode interface.

A number of techniques for controlling a fuel cell system during shutdown have been disclosed. Japanese Patent Application Publication No. 04004570 discloses a fuel cell system in which a standby gas containing mainly hydrogen is supplied to the anode of the fuel cell during a shutdown of the system and when the system is at its normal operating temperature. This prevents oxidation of the anode. Another Japanese Patent Application Publication No. 04324253 describes a fuel cell system having a standby gas used to prevent oxidation of the anode of the fuel cell during shutdown of the system. In this case the standby gas is prepared by mixing a reducing gas with nitrogen.

Japanese Patent Application Publication No. 10289724 discloses another method used during shutdown of a fuel cell system. In this method, an inerting gas made of nitrogen or argon and containing between 1 and 10% carbon dioxide is supplied to the fuel cell cathode to reduce growth of $LiAlO2$ particles in the electrolyte plate. European Patent Application Publication No. EP01481436 refers to another inerting procedure used during shutdown of a fuel cell system in which water vapor is supplied to the fuel cell anode and an electrolysis reaction is effected by applying an external potential to the fuel cell. Finally, Japanese Patent Application Publication No.10032013 describes a purging method used to control a fuel cell system after a shut down in which purging is accomplished by re-circulating the anode and cathode streams separately and inerting the streams separately.

The systems discussed above, however, do not provide an overall system capable of realizing the conditions described previously as required by a MCFC system during shutdown and restart. An arrangement satisfying these conditions is thus needed for efficient operation of the fuel cell system.

It is therefore an object of the present invention to provide a fuel cell system and method which can satisfy the conditions for efficient operation of the system during shutdown and/or restart.

It is also an object of the present invention to provide an integrated fuel cell system where the appropriate atmosphere is maintained in the anode and the cathode of the fuel cell of the system during shutdown, without physically isolating the two.

It is a further object of the present invention to provide an arrangement and method of the above type which is cost effective and simple.

SUMMARY OF THE INVENTION

In the embodiments of the invention to be described hereinafter, the above and other objectives are realized in a fuel cell system and method in which the fuel cell system receives and an input oxidant gas and an input fuel gas, and in which a fuel processing assembly is provided and is adapted to at least humidify the input fuel gas which is to be supplied to the anode of the fuel cell of the system whose cathode receives the oxidant input gas via an anode oxidizing assembly which is adapted to couple the output of the anode of the fuel cell to the inlet of the cathode of the fuel cell during normal operation, shutdown and restart of the fuel cell system, and in which a control assembly is further provided and is adapted to respond to shutdown of the fuel cell system during which at least the input fuel gas ceases to be received by the fuel cell system, the control assembly being further adapted to, when the fuel cell system is shut down: control the fuel cell system so as to enable a purging gas to be able to flow through the fuel processing assembly to remove humidified fuel gas from the processing assembly and to enable a purging gas to be able to flow through the anode of the fuel cell.

In this way, when shutdown occurs, humidified fuel (fuel and vaporized water or steam) is purged from the fuel processing assembly and the fuel cell, while maintaining a reducing atmosphere in the anode of the fuel cell. An oxidant atmosphere is also maintained in the cathode of the fuel cell.

In a further aspect of the invention, the control assembly is further adapted to respond to restart of the fuel cell system during which the oxidant gas begins to be again received by the fuel cell system and sometime thereafter the fuel gas begins to be again received by and flow at a predetermined level in the fuel cell system, the control assembly being additionally adapted to, from restart of said fuel cell system until when the fuel gas flows at the predetermined level in the fuel cell system, control the fuel cell system so as to enable a reducing cover gas containing carbon dioxide to be able flow through the anode of the fuel cell. In this way, during restart, the carbon dioxide in the cover gas when passing through the anode of the fuel cell prevents particle growth at the matrix-anode interface. Also, during this time, the anode exhaust gas, when oxidized with the input oxidant gas, results in a resultant gas for the cathode of the fuel cell which contains adequate carbon dioxide to prevent electrolyte loss from the cathode.

In a first embodiment of the invention to be described hereinbelow, the control assembly isolates the fuel cell from the fuel processing assembly, while purging gas is supplied separately to the fuel cell and fuel processing assembly and while the purging gas and the humidified fuel from the fuel processing assembly are vented. In this embodiment, high temperature valves are used to effect the isolation and venting. In a second embodiment, the control assembly isolates the fuel processing assembly from its upstream components, while maintaining the coupling of the fuel cell and fuel processing assembly and while supplying the purging gas to the fuel processing assembly so that after it flows through the fuel processing assembly it then flows through the fuel cell anode. In this case, the purging gas and humidified fuel gas are purged through the fuel cell, while low temperature solenoid valves are used for the isolation.

In both the above embodiments, the control assembly uses similar components for supplying a reducing cover gas to the fuel cell anode during restart of the fuel cell system.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

The embodiments of FIG. 1 and FIG. 2 of the present invention discussed below involve an integrated MCFC system where the appropriate atmosphere is maintained in the anode and the cathode of the fuel cell of the system during a shutdown, without physically isolating the two. Appropriate atmosphere is also maintained in the anode and the cathode during restart before input fuel again begins to flow at a predetermined level in the system. The embodiments differ as to how the humidified input fuel (input fuel and steam) is purged and vented after a shutdown.

Figure 1:
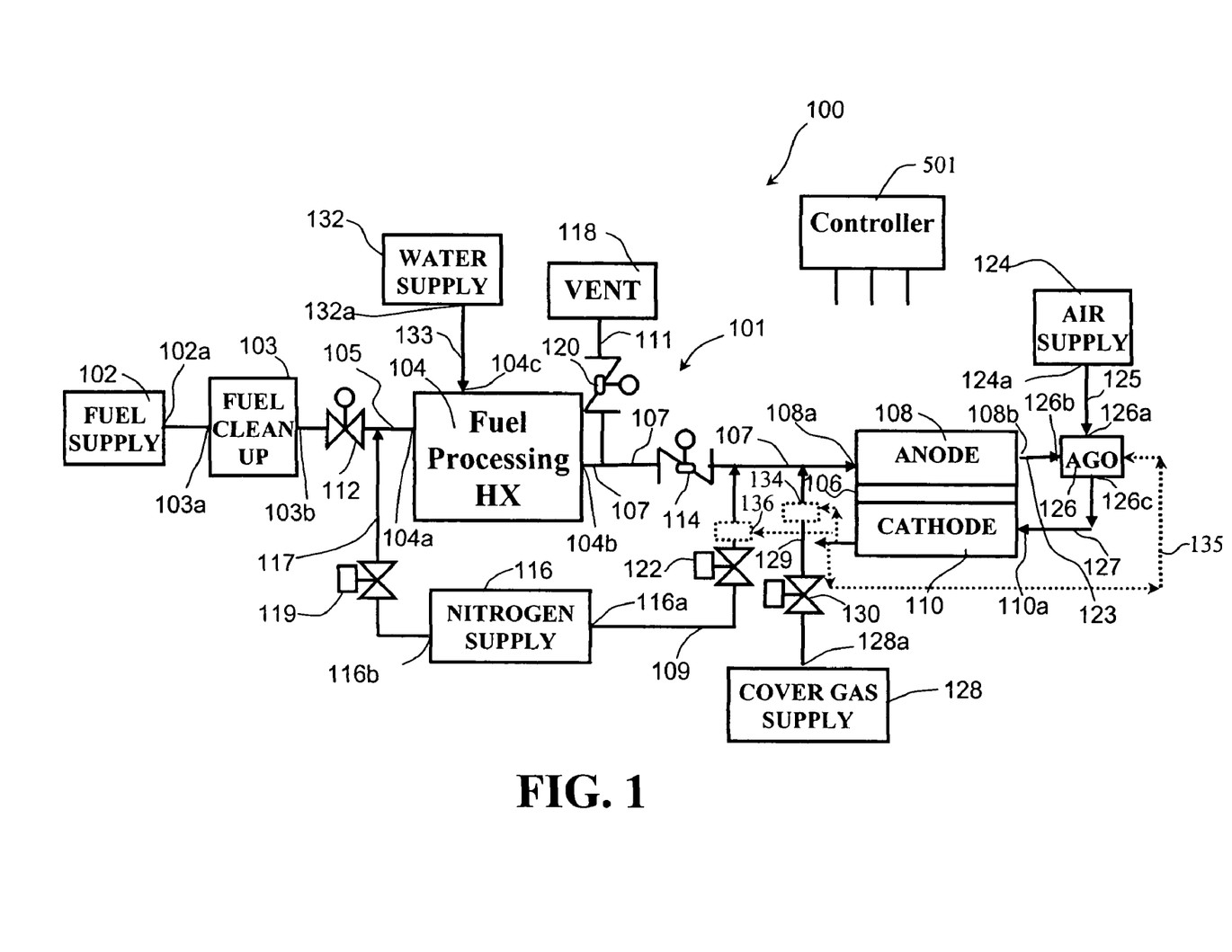
FIG. 1 shows a MCFC system in accordance with a first embodiment of the present invention.

FIG. 1 shows a MCFC system 100 in accordance with the first embodiment of the invention comprising a fuel supply 102 for supplying fuel gas to the fuel inlet 102a of the system, a fuel cleanup system 103 which may include a desulfurizer, a water supply system 132 for supplying water, a fuel processing assembly 104, a fuel cell 106, including an anode 108 and a cathode 110, an air supply system 124, an anode gas oxidizer ("AGO") 126 adapted to couple the output of the anode 108 of the fuel cell 106 to the input of the cathode 110 of the fuel cell during normal operation, shutdown and restart of the system 100, and a control assembly 101 for isolating the anode 108, for providing reducing cover gas to the anode from a cover gas supply 128 and for supplying a purging gas, shown as nitrogen from a nitrogen supply 116, to the anode and to the input fuel line of the fuel processing assembly 104. In the illustrative arrangement shown in FIG. 1, the fuel processing assembly 104 includes at least a heating unit, such as a heat exchanger, for at least providing a humidified fuel by vaporizing the water from the supply 132 to steam and preheating the fuel from the fuel inlet 102a to a required temperature. However, it is understood that the fuel processing assembly 104 may include additional units for processing the fuel gas before it enters the anode 108, including, but not limited to, a pre-converter.

The fuel supply inlet 102a is coupled with an inlet 104a of the fuel processing assembly 104 by a connecting line 105, the water supply inlet 132a couples the water supply 132 with the inlet 104c of the fuel processing assembly 104 by a connecting line 133 and an outlet 104b of the fuel processing assembly 104 is coupled with an inlet 108a of the anode 108 by a connecting line 107. The anode outlet 108b is coupled with the AGO 126 by a connecting line 123. The air supply system 124 is coupled with the AGO 126 by a connecting line 125 and the AGO 126 is coupled to the cathode 110 by a connecting line 127. The supply of fuel from the fuel inlet 102a is controlled by a control valve 112, which is open during MCFC operation and closed during shutdown.

The control assembly 101 includes a high temperature motor-operated isolation valve 114 in the line 107 between the anode 108 and the fuel processing assembly 104, a nitrogen supply 116 coupled to the connecting line 107 between the isolation valve 114 and the anode inlet 108a by a connecting line 109 fed by a nitrogen supply inlet 116a, a cover gas supply 128 coupled to the connecting line 107 between the isolation valve 114 and the anode inlet 108a by a connecting line 129 fed by a cover gas supply inlet 128a, a nitrogen supply 116 coupled to the connecting line 105 between the fuel control valve 112 and fuel processing assembly inlet 104a by a connecting line 117 fed by a nitrogen supply inlet 116b, and a vent 118 coupled to the line 107 between the fuel processing assembly 104 and the isolation valve 114 by a connecting line 111. The assembly 101 is also provided with a high temperature motor-operated vent valve 120 in the line 111 for opening and closing of the vent, a solenoid valve 130 in the line 129 for controlling the cover gas supplied to the anode 108 from the cover gas supply inlet 128a, a solenoid valve 122 in the line 109 for controlling the nitrogen gas supplied to the anode 108 from the nitrogen supply inlet 116a, and a solenoid valve 119 in the line 117 for controlling the nitrogen gas supplied to the connecting line 105 between the fuel control valve 112 and fuel processing assembly inlet 104a fed by the nitrogen supply inlet 116b.

Figure 3A:
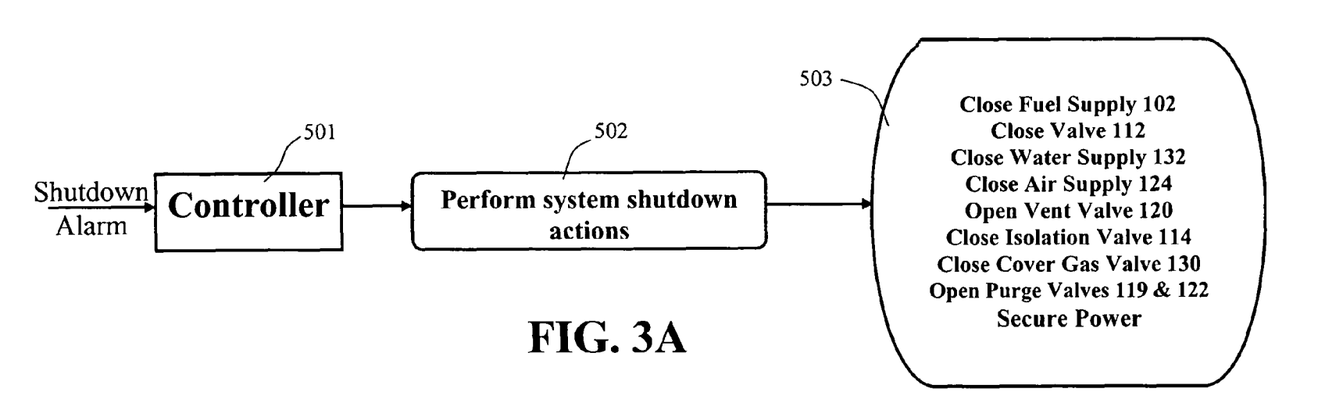
FIGS. 3A and 3B show the control functions of the control assembly of the system of FIG. 1 during system shutdown and restart, respectively.
Figure 3B:
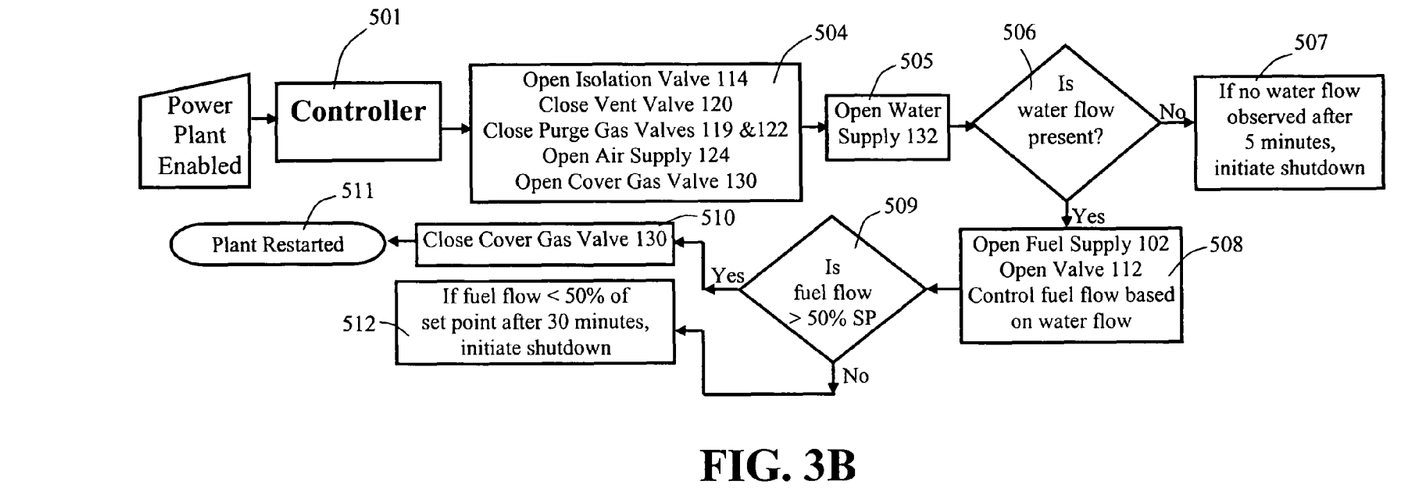

The control assembly 101 also includes a program controlled controller 501 whose operation is controlled by a software program or product stored on a computer readable storage medium. The control effected by the controller 501 during shutdown and restart is depicted in FIGS. 3A and 3B, respectively. During normal operation of the system 100 in which power is being provided by the system, the controller 501 controls the system 100 so that the fuel supply 102, air supply 124 and the water supply 132 are open. The control valve 112 and the isolation valve 114, in turn, are also controlled to be open, while the vent valve 120 and the solenoid valves 119, 122 and 130 are controlled to be closed. The opened valves 112 and 114 allow humidified fuel gas to be carried to the anode 108.

When the system 100 shuts down, the controller 501 controls the system to perform shutdown actions as depicted in FIG. 3A. In particular, during the shutdown period, the controller 501 in response to a shutdown alarm is controlled by its program to perform a shutdown process 502 which includes the shutdown operations 503. Specifically, the fuel supply 102, air supply 124 and water supply 132 are closed. The control valve 112 and the isolation valve 114 are also closed, isolating the fuel cell 106 from the fuel processing assembly 104 and the fuel processing assembly 104 from the fuel supply 102. The solenoid operated valve 122, on the other hand, is opened and allows a predetermined amount of nitrogen, e.g., approximately 1 SCFM of nitrogen, to be supplied to the anode 108 from the nitrogen supply 116. The nitrogen supplied to the anode 108 maintains the anode in a reducing atmosphere and carries any residual humidified fuel through the anode into the AGO 126, where it is oxidized using any residual oxygen present in the AGO. The oxidized fuel then flows into the cathode.

The solenoid operated valve 119 also is opened and it also allows a further predetermined amount of nitrogen, e.g., approximately 10 SCFM of nitrogen, to be supplied to the fuel processing assembly 104. The vent valve 120 likewise is opened. As a result, the nitrogen passing through the fuel processing assembly 104 is able to purge the residual humidified fuel (fuel and steam) from the assembly and the associated fuel lines through the open vent valve 120.

When the system 100 restarts, the controller 501 controls the system to perform actions as depicted in FIG. 3B. In response to a system enable signal from an operator, the controller controlled by its control program, performs a first process 504 in which the air supply 124, the isolation valve 114 and the solenoid valve 130 are opened. In this process also, the vent valve 120 and the solenoid valves 119 and 122 are closed.

Opening of the solenoid valve 130 allows the flow of a predetermined amount of reducing cover gas, e.g., approximately 9 scfm of cover gas (typically, predominately nitrogen gas) to flow into the anode 108. The cover gas contains an amount of hydrogen (i.e., at about least 3% hydrogen) so as to maintain a reducing gas atmosphere in the anode 108. The cover gas also contains an amount of carbon dioxide which prevents carbon particle growth in the electrolyte matrix-anode interface The cover gas, after flowing through the anode 108, passes into the anode gas oxidizer 126 via the connecting line 123. Fresh air from the fresh air supply 124 mixes with the cover gas in the anode gas oxidizer 126 before flowing to the cathode 110. In order to ensure that the carbon dioxide in the oxidized air-cover gas mixture reduces electrolyte decomposition in the cathode 110, the carbon dioxide in the cover gas is of an amount such that the carbon dioxide in the oxidized air-cover gas mixture is maintained at a concentration of about 300 ppm carbon dioxide in the cathode.

Returning to FIG. 2A, from process 504, the controller 501 moves to process 505 in which the water supply 132 is opened. In process 506, the presence of water flow is detected and if not present, process moves to 507 which causes a shutdown alarm and the shutdown operation of FIG. 2A to be initiated, if water flow is not present for a set period of time, e.g. five minutes.

If water flow is present, process moves to 508 in which the fuel supply 102 and the control valve 112 are opened to control the flow of input fuel gas based on the water flow. Process then moves to 509 which gauges whether the fuel flow is greater than 50% of a desired or set point fuel flow and if yes process moves to 510 in which the solenoid valve 130 is closed. This stops the flow of cover gas, thereby resulting in completion of system restart 511. If in process 509, the fuel flow level is less than 50% of the set point, process moves to 512 in which shutdown is initiated after this condition exists for a set period of time, shown as 30 minutes.

In the restart process, therefore, the flow of input oxidant gas (air) is first initiated and the flow of input fuel gas is initiated sometime thereafter. Also, the flow of reducing cover gas is initiated with the flow of input oxidant gas and continues until the flow of input fuel gas is initiated and reaches a predetermined level. At this time, the cover gas flow is stopped. The anode 108 is thus maintained in a reducing atmosphere and the cathode 110 supplied with a desired amount of carbon dioxide throughout the entire restart process.

As shown, in FIG. 1, the control assembly 101 may also include a heating system 134 to pre-heat the cover gas before it enters the anode 108. The heating system may be an electrical heater or a heat exchanger which uses the heat of the cathode exhaust gas to heat the cover gas. A configuration similar to that described in U.S. Pat. No. 4,917,971 may be used to heat the cover gas using the cathode exhaust gas prior to the introduction to the anode 108.

Also shown, in FIG. 1 is a heating system 136 in the connecting line 109 that may be included in the control assembly 101, to pre-heat the purge gas flowing through the connecting line 109 when the system is shutdown, from the nitrogen supply inlet 116a to the anode 108. As discussed above, the heating system 136 may use the heat of the cathode exhaust gas.

Purge gas which flows in the line 117 during a system shutdown, supplied to the connecting line 105 between the fuel control valve 112 and fuel processing assembly inlet 104a from the nitrogen supply inlet 116b, is heated by the fuel processing assembly 104.

As can be appreciated, in the system of FIG. 1, the vent valve 120 must provide tight sealing between the connecting line 107 and the vent 118 during the operation of the system 100 in order to avoid fuel gas leaks into the vent 118. Similarly, the isolation valve 114 must provide tight sealing to efficiently isolate the anode 108 and to prevent gas air leaks back into the anode 108 from the vent 118 during the system shutdown.

Any inability of the valves 114, 120 to re-seal tightly after opening, however, may contribute to a reduction in fuel gas flow to the anode 108 during the operation of the system 100 and decrease the system's efficiency and power production. Moreover, the high-temperature motor-operated valves 114, 120 are expensive and require additional power from a power source such as an uninterruptible power supply, for their operation.

In a modification of the embodiment of FIG. 1 to alleviate the need for the two high-temperature valves, the isolation valve 114 can be removed from the connecting line 107. Additionally, the length and diameter of the connecting lines 107 and 111 connecting the processing assembly 104 to the vent 118 can be adjusted (made longer in length and smaller in diameter) so as to reduce the flow rate of the humidified gas being vented to a low enough temperature (e. g., 15 feet of un-insulated ¼ inch diameter stainless steel tubing will reduce the gas temperature to less than about 150° F.) to be able to replace the valve 120 with a low temperature valve such as a solenoid valve. As a result, with this modification, only one valve would be needed, and this valve can be a low temperature, less expensive solenoid valve.

Figure 2:
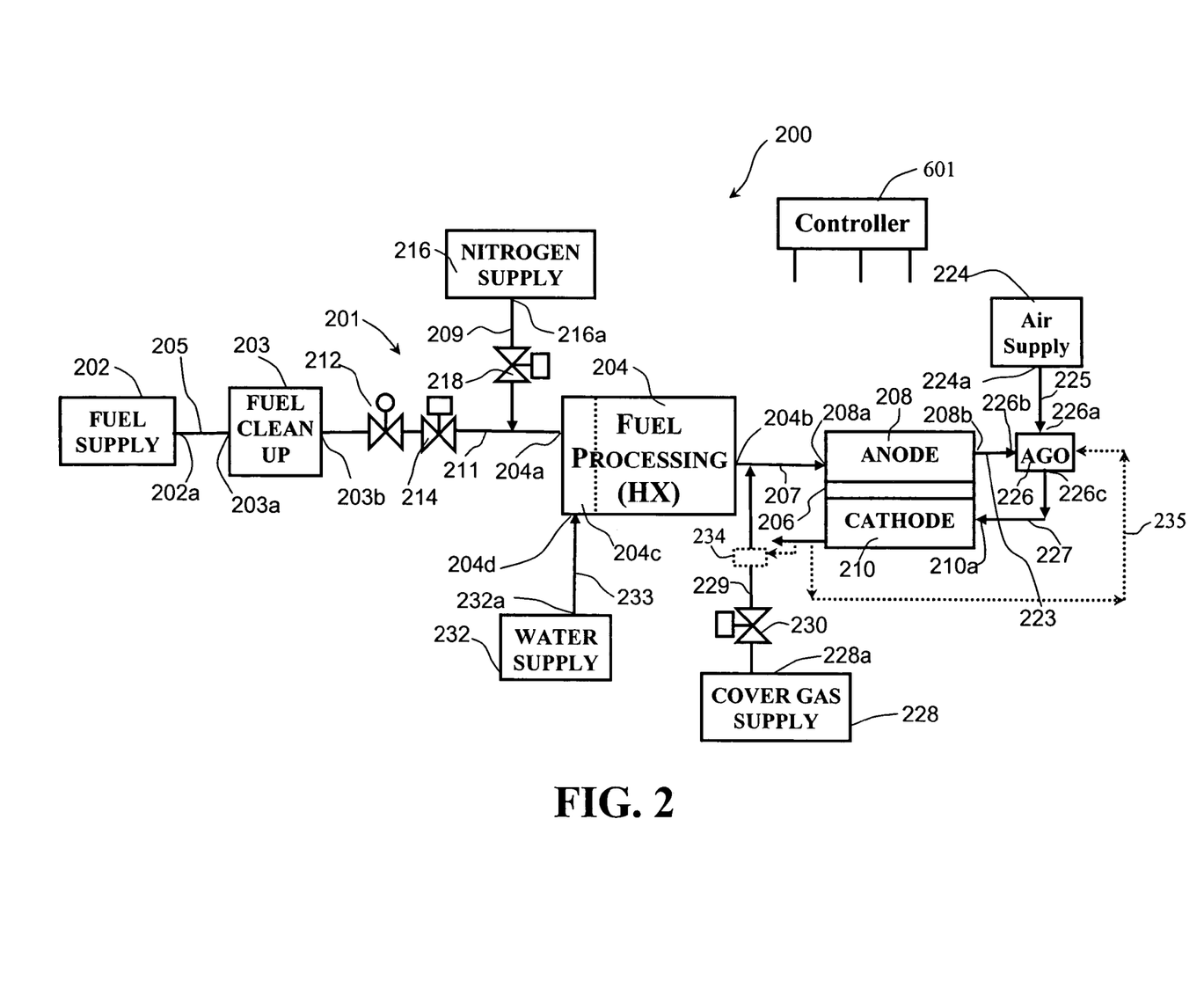
FIG. 2 shows a MCFC system in accordance with a second embodiment of the invention.

FIG. 2 shows a fuel cell system 200 employing a control assembly 201 in accordance with a second embodiment of the invention The fuel cell system 200 also includes a fuel inlet 202a for supplying fuel in gaseous or other form from a supply 202 to the system 200, a fuel clean up system 203 which may include a desulfurizer, a fuel processing assembly 204 for processing fuel gas, a water supply inlet 232a to provide water flow from a water supply 232 to the fuel processing assembly 204, a fuel cell 206 comprising an anode 208 and a cathode 210, an air supply system 224, an anode gas oxidizer ("AGO") 226 adapted to couple the output of the anode 208 of the fuel cell 206 to the input of the cathode 210 of the fuel cell during normal operation, shutdown and restart of the system 200 and a cover gas supply system 228. In the illustrative arrangement shown in FIG. 2, the fuel processing assembly 204 includes at least a heating unit 204c, such as a heat exchanger, for at least providing a humidified fuel by vaporizing the water to steam and pre-heating the fuel from the fuel inlet 202a to a required temperature. However, it is understood that the fuel processing assembly 204 may further include additional units for processing fuel gas before it enters the anode 208, including, but not limited to, a pre-converter.

As shown, the fuel inlet 202a is coupled with an inlet 203a of the fuel clean up system 203 by a connecting line 205, the outlet 203b of which is coupled with an inlet 204a of the fuel processing assembly 204 by a connecting line 211, the water supply inlet 232a is coupled to the inlet 204d of the fuel processing assembly 204 by a connecting line 233, and an outlet 204b of the fuel processing assembly 204 is, in turn, coupled with an inlet 208a of the anode 208 by a connecting line 207. The delivery of the fuel gas from the inlet 202a to the system 200 is controlled by a control valve 212, which follows the fuel clean up outlet 203a on the connecting line 211. The control valve 212 is open during the normal operation of the system 200 to allow fuel gas to be supplied to the fuel processing assembly 204, and closed during the system shutdown.

As shown in FIG. 2, the control assembly 201 comprises an isolation unit 214 for isolating the fuel processing assembly 204 and the anode 208 from the fuel flowing from the control valve 212, a cover gas inlet 228a for providing cover gas from the cover gas system 228 to the anode 208 during restart until a predetermined level fuel flow is reached and a purging gas inlet 216a for supplying a purging gas from a purging gas supply 216 to the fuel processing assembly 204 when the system operation is shut down. In this case, the isolation unit 214 is shown as an isolation valve, which is provided on the connecting line 211 following the control valve 212 and preceding the fuel processing assembly 204 with respect to the direction of the fuel flow from the fuel inlet 202a to the anode 208. The purging gas inlet 216a is coupled with the connecting line 211 via a connecting line 209 at a location on the line 211 between the isolation valve 214 and the fuel processing assembly 204. A purging gas control assembly, including a purging gas valve 218, is also provided on the line 209 to control the supply of the purging gas to the system 200. The cover gas inlet 228a is coupled with the connecting line 207 via a connecting line 229 at a location on the line 207 between the fuel processing assembly 204 and the anode 208. A cover gas isolation valve 230 is provided on the line 229 to control cover gas flow to the anode 208 during restart.

In this illustrative case, the purging gas is nitrogen, the purging gas supply 216 is a nitrogen gas supply, and the purging gas valve 218 is a nitrogen gas valve. In addition, in the illustrative example shown, the nitrogen gas control valve 218 and the isolation valve 214 are solenoid valves. In this case, the cover gas contains predominately hydrogen with a reducing gas, e.g. at least 3% hydrogen. Additionally, the cover gas contains sufficient carbon dioxide so that in flowing through the anode 208 it reduces particle growth in the electrolyte matrix-anode interface and so that it ensures the presence of at least 300 ppm carbon dioxide in the cathode gas during restart. Cover gas isolation valve 230 is a solenoid valve rated for nitrogen gas.

Figure 4A:
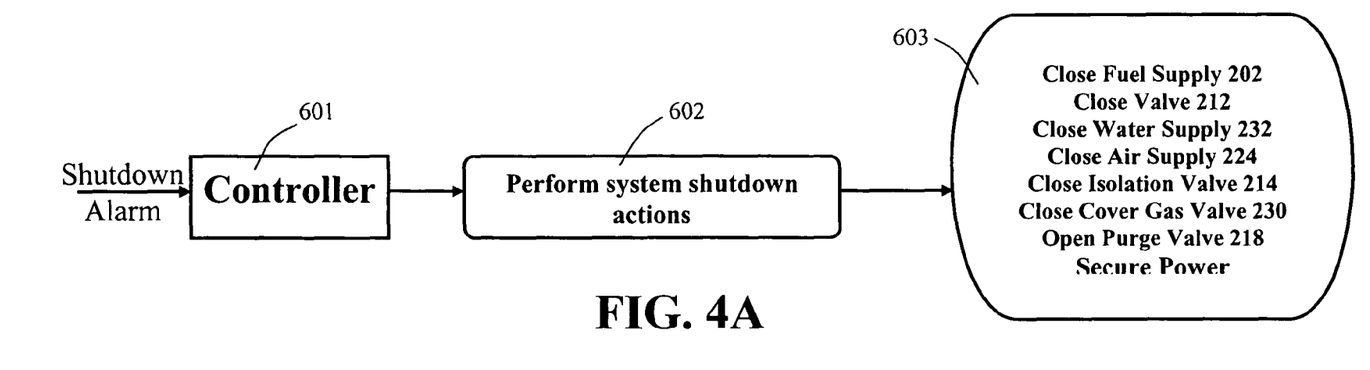
FIGS. 4A and 4B show the control functions of the control assembly of the system of FIG. 2 during system shutdown and restart, respectively.
Figure 4B:
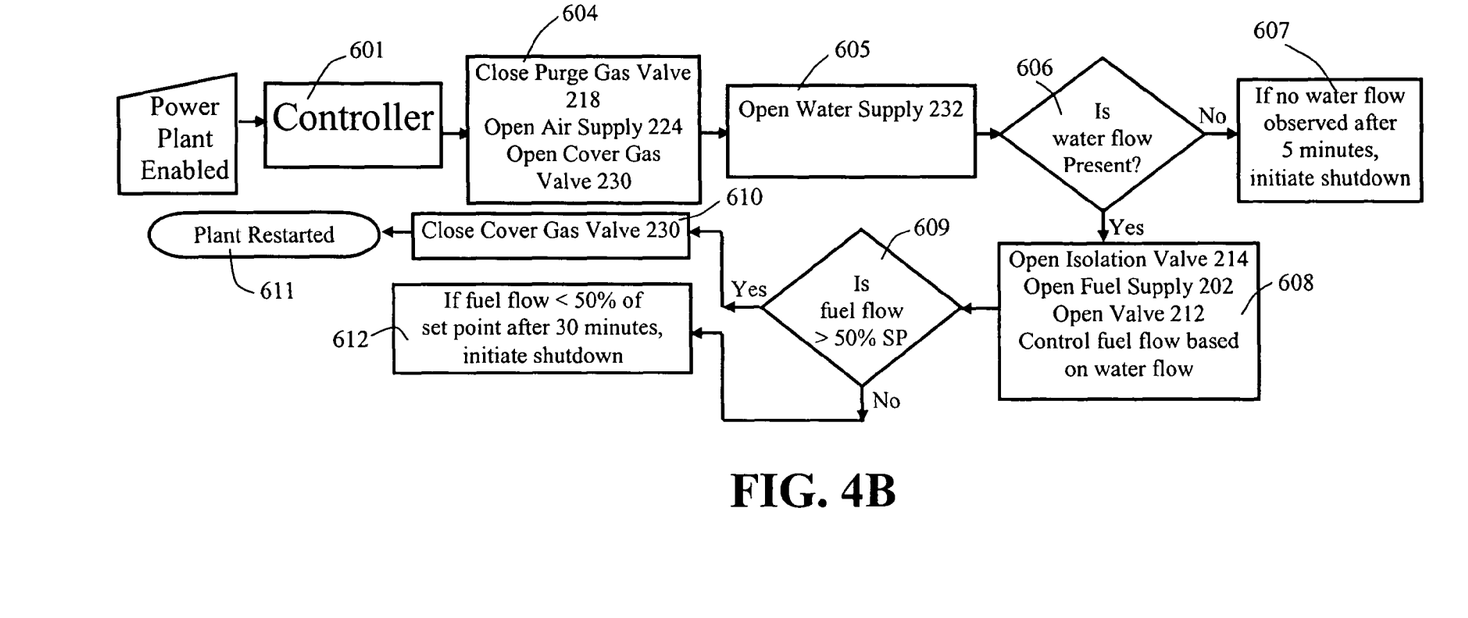

The control assembly 201 also includes a program controlled controller 601 whose operation is controlled by a software program or product stored on a computer readable storage medium. The control effected by the controller 601 during shutdown and restart is depicted in FIGS. 4A and 4B, respectively. During normal operation of the system 200 in which power is being provided by the system, the controller 501 controls the system 200 so that the control valve 212 and the isolation valve 214 are open to allow fuel gas to be delivered from the fuel supply inlet 202a to the inlet 204a of the fuel processing assembly 204 through the fuel clean up system 203. Water is also delivered to another inlet 204d of the fuel processing assembly 204 from the water supply inlet 232a. In the fuel processing assembly 204, the water is vaporized to produce steam and the steam mixed with the fuel gas to produce a humidified fuel gas which is pre-heated to typically 300° Celsius. Pre-heated humidified fuel exits the fuel processing assembly 204 through the outlet 204b into the connecting line 207 and is carried to the fuel cell anode 208. As mentioned above, the fuel processing assembly 204 may include additional fuel processing units, such as a pre-converter, in which case, the fuel gas would be processed in these units and would thereafter be carried to the fuel cell anode 208.

When the system 200 shuts down, the controller 600 controls the system to perform shutdown actions as depicted in FIG. 4A. In particular, during the shutdown period, the controller 601 in response to a shutdown alarm is controlled by its program to perform a shutdown process 602 which includes the shutdown operations 603. In particular, the control is effected such that the control valve 212 is closed so that the fuel gas is no longer being supplied from the inlet 202a to the system 200. Fuel supply 202, air supply 224 and water supply 232 are also closed cutting the fuel, air and water supply. The isolation valve 214 is likewise closed in order to isolate the fuel processing assembly 204 and the anode 208 from any fuel inventory in the fuel clean up system 203 that may escape through the control valve 212. Valve 230 is similarly closed. In addition, the nitrogen supply valve 218 is opened to allow nitrogen gas to be delivered to the fuel processing assembly 204. The nitrogen gas purges residual humidified fuel (fuel and steam) in the fuel processing assembly 204 into the anode 208 and also prevents back flowing of the oxidant gas from the cathode 210 into the anode 208. The fuel processing assembly 204 provides heat to the purging gas and raises the temperature of the purging gas to the desired temperature before it flows into the anode 208.

As shown, nitrogen gas is supplied from the nitrogen supply 216 and is allowed to pass along the line 209 through the nitrogen gas valve 218 to the connecting line 211, which in turn carries the nitrogen gas to the fuel processing assembly 204. The nitrogen gas purges the fuel processing assembly 204 and is thereafter carried to the anode 208 via the connecting line 207. Humidified fuel present in the fuel processing assembly 204 and connecting lines is purged through the anode 208 into the anode gas oxidizer 226, where the fuel is oxidized using the oxygen inventory present in the oxidizer 226. The oxidized fuel flows into the cathode.

When the system 200 restarts, the controller 601 controls the system to perform actions as depicted in FIG. 4B. In response to a system enable signal from an operator, the controller controlled by its control program, performs a first process 604 in which the air supply 224 is opened and the control valve 218 is closed and the control valve 230 is opened. The control valve 212 and isolation valve 214 are held closed at this time in order to isolate the fuel processing assembly 204 and the anode 208 from the upstream components, i.e., fuel clean up system 203.

Opening of the solenoid valve 230 allows the flow of a predetermined amount of reducing cover gas, e.g., approximately 9 scfm of cover gas to flow into the anode 208. The cover gas contains an amount of hydrogen sufficient to maintain a reducing gas atmosphere in the anode 108. It also contains carbon dioxide which reduces particle growth in the matrix-anode interface.

The cover gas, after flowing through the anode 208, passes into the anode gas oxidizer 226 via the connecting line 223. Fresh air from the fresh air supply 224 mixes with the cover gas in the anode gas oxidizer 226 before flowing to the cathode 210. Due to the carbon dioxide in the cover gas, the carbon dioxide in the oxidized air-cover gas mixture is maintained at a concentration of 300 ppm carbon dioxide so as to reduce electrolyte matrix decomposition in the cathode.

Looking again at FIG. 4B, from process 604, the controller moves to process to 605 in which the water supply 232 is opened. In process 606, the presence of water flow is detected and if water is not present, process moves to 607. In process 607 a shutdown alarm and the shutdown operation of FIG. 2A are initiated, if the water flow is not present for a set period of time, e.g. five minutes.

If the water flow is present in the process 606, process moves to 608 in which the fuel supply 202 and the valves 212 and 214 are opened to control the flow of input fuel gas based on the water flow. Process then moves to 609 which gauges whether the fuel flow is greater than 50% of a desired or set point fuel flow level and if yes process moves to 610 in which the solenoid valve 230 is closed. This stops the flow of cover gas, thereby resulting in completion of the system restart 611. If in process 609, the fuel flow is less than 50% of the set point, process moves to 612 in which shutdown is initiated after this condition exists for a set period of time, shown as 30 minutes.

In the restart process, therefore, the flow input oxidant gas (air) is first initiated and the flow of input fuel gas is initiated sometime thereafter. Also, the flow of reducing cover gas is initiated with the flow of input oxidant gas and continues until the flow of input fuel gas is initiated and reaches a predetermined level. At this time, the cover gas flow is stopped. The anode 208 is thus retained in a reducing atmosphere and the cathode 210 supplied with a desired amount of carbon dioxide throughout the entire restart process.

As shown in FIG. 2, the control assembly 201 may also include a heating unit 234 to pre-heat the cover gas before it enters the anode 208 during a re-start. The heating unit may be an electrical heater or a heat exchanger which uses the heat of the cathode exhaust gas to heat the cover gas. A configuration similar to that described in U.S. Pat. No. 4,917,971 may be used to heat the cover gas using the cathode exhaust gas prior to the introduction to the anode 108.

As can be appreciated in the system of FIG. 2, the need to vent the humidified fuel via a separate vent is eliminated.

Also, since the isolation valve 214 precedes the fuel processing assembly 204, the valve is substantially independent of temperature gradients in the system 200. As a result, as above indicated, a solenoid valve which is able to re-seal tightly when the system 200 is shut down can be used for the valve 214. This valve prevents fuel inventory from the fuel clean up system 203 from entering the fuel processing assembly 204 and the anode 208 during shutdown. The humidified fuel (fuel and steam) present in the fuel processing assembly 204, in turn, is caused by the purging gas to flow into the anode gas oxidizer 226 through the anode 208. This fuel is oxidized in the anode gas oxidizer 226 and the oxidizing condition in the cathode is maintained.

Since the nitrogen supply valve 218 is also positioned to precede the processing assembly 204, its operation is likewise substantially temperature independent. A solenoid valve is thus suitable for this valve also, providing increased reliability and responsiveness when nitrogen gas is to be delivered to the anode after the system shutdown.

The systems 100 and 200 of FIGS. 1 and 2 can be modified in a number of ways. One modification would be to allow a fixed amount of air to flow from the air supply 124 or 224 to the anode gas oxidizer 126 or 226 after a shutdown to maintain oxidizing atmosphere in the cathode. Another modification would be to recycle, via a recycle line 135 or 235, a portion of the cathode gas flowing out of the cathode 110 or 210 back to the anode gas oxidizer 126 or 226. During a shutdown, this recycled flow would provide sufficient oxygen inventory to oxidize the fuel that is purged into the anode gas oxidizer 126 or 226 from the fuel processing assembly 104 or 204 through the anode 108 or 208.

It should be noted that the controllers 501 and 601 used in the embodiments of FIGS. 1 and 2 can be conventional PLCs (programmable logic controllers—essentially highly reliable robust computers) made by GE. The control program used for the embodiments, in turn, can be a software product called "Versapro" again a GE product implemtable in GE PLCs for industrial automation.

In all cases it is understood that the above-described arrangements are merely illustrative of the many possible specific embodiments, which represent applications of the present invention. Numerous and varied other arrangements can be readily devised in accordance with the principles of the present invention without departing from the spirit and the scope of the invention.

We claim:

1. A fuel cell system for receiving input fuel gas and input oxidant gas comprising:
    a fuel processing assembly for at least humidifying the input fuel gas;
    a fuel cell having an anode configured to receive the humidified input fuel gas and a cathode configured to receive the input oxidant gas;
    an anode oxidizing assembly coupling the output of the anode of said fuel cell to the input of said cathode of said fuel cell during normal operation, shutdown and restart of the fuel cell system and further configured to receive at least one of said input oxidant gas and exhaust gas from said cathode;
    and a control assembly responding to shut down of said fuel cell during which at least the input fuel gas ceases to be received by said fuel cell system, said control assembly, when said fuel cell system is shut down: controlling said fuel cell system so as to enable a purging gas to be able to flow through said fuel processing assembly to remove humidified fuel gas from said fuel processing assembly, to enable a purging gas to be able to flow through said anode of said fuel cell, and to enable a predetermined flow of one of input oxidant gas and exhaust gas from said cathode to said anode oxidizing assembly.

2. A fuel cell system in accordance with claim 1, wherein:
said control assembly is further adapted to when said fuel cell system is shut down: control said fuel cell system so as to isolate said fuel processing assembly from said fuel cell and to enable the purging gas which flows through said fuel processing assembly after passing through said fuel processing assembly to be vented.

3. A fuel cell system in accordance with claim 2, wherein:
said anode oxidizing assembly is adapted to perform an oxidation reaction and to generate an output gas which is coupled as an input to said cathode of said fuel cell.

4. A fuel cell system in accordance with claim 2, wherein:
said fuel processing assembly comprises an input line adapted to receive the input fuel gas and an output line coupled to said anode of said fuel cell;
and said control assembly comprises: a first valve connected in said output line, said first valve being closed during shutdown of said fuel cell system so as to isolate said fuel processing assembly from said anode of said fuel cell.

5. A fuel cell system in accordance with claim 4, wherein:
said control assembly further comprises: a first line connected to said output line of said fuel processing assembly at a point preceding said first valve; a second valve in said first line, said second valve being opened during shutdown of said fuel cell system; and a vent connected to said first line at a point following said second valve.

6. A fuel cell system in accordance with claim 5, wherein:
said control assembly further comprises: a third valve in said input line and adapted to be closed during shutdown of said fuel cell system; a second line connected to the input line of said fuel processing assembly following said third valve and adapted to receive the purging gas to be passed through said fuel processing assembly; a third line connected to said output line of said fuel processing assembly at a point following said first valve and adapted to receive the purging gas to be passed through said anode of said fuel cell; a fourth valve connected in said second line and opened during shutdown of said fuel cell system; and a fifth valve connected in said third line and opened during shutdown of said fuel cell system.

7. A fuel cell system in accordance with claim 6, wherein:
said control assembly during normal operation of said fuel cell system controls said first and third valves to be open and said second, fourth and fifth valves to be closed; and
said control assembly during shutdown of said fuel cell system controls said first and third valves to be closed and said second, fourth and fifth valves to be opened.

8. A fuel cell system in accordance with claim 7, wherein:
said anode oxidizing assembly is adapted to perform an oxidation reaction and to generate an output gas which is coupled as an input to said cathode of said fuel cell.

9. A fuel cell system in accordance with claim 8, wherein:
said system further comprises a heating unit in said third line following said fifth valve and responsive to the exhaust gas from said cathode of said fuel cell for heating the purging gas passing through said third line;
said first and second valves comprise high-temperature motor operated valves;
said third, fourth and fifth valves comprise solenoid valves;
said purging reducing gas comprises nitrogen;
said fuel processing assembly is adapted to receive water from a water supply; and
said third and fourth lines are adapted to receive said purging gas from a common supply.

10. A system in accordance with claim 8, wherein:
said control assembly is further adapted to respond to restart of said fuel cell system during which said oxidant gas begins to be again received by said fuel cell system and sometime thereafter said fuel gas begins to be again received by said fuel cell system, said control assembly being further adapted to: from restart of said fuel cell system until when said fuel gas flows in said fuel cell system at a predetermined level, control said fuel cell system so as to enable a reducing cover gas containing carbon dioxide to be able to flow through said anode of said fuel cell.

11. A fuel cell system in accordance with claim 10, wherein:
said control assembly further comprises: a fourth line connected to said output line of said fuel processing assembly at a point following the point at which said third line is connected to said output line of said fuel processing assembly, and a sixth valve in said fourth line, said sixth valve being closed during normal operation of said fuel cell system and being opened from restart of said fuel cell system until when said input fuel gas flows at said predetermined level in said fuel cell system.

12. A fuel cell system in accordance with claim 11, wherein:
said fuel system further comprises a heating unit in said third line following said fifth valve and responsive to the exhaust gas from said cathode of said fuel cell for heating the purging gas passing through said third line;
said first and second valves comprise high-temperature motor operated valves;
said third, fourth, fifth and sixth valves comprise solenoid valves;
said purging gas comprises nitrogen;
said fuel processing assembly is adapted to receive water from a water supply;
said third and fourth lines are adapted to receive said purging gas from a common supply; and
said reducing cover gas contains hydrogen.

13. A fuel cell system in accordance with claim 2, wherein:
said anode oxidizing assembly is adapted to perform an oxidation reaction and to generate an output gas which is coupled as an input to said cathode of said fuel cell; and
said control assembly is further adapted to respond to restart of said fuel cell system during which said oxidant gas begins to be again received by said fuel cell system and sometime thereafter said fuel gas begins to be again received by said fuel cell system, said control assembly being further adapted to: from restart of said fuel cell system until when said fuel gas flows in said fuel cell system at a predetermined level, control said fuel cell system to be enabled to allow a reducing cover gas containing carbon dioxide to be able to flow through said anode of said fuel cell.

14. A fuel cell system in accordance with claim 1, wherein:
said control assembly is further adapted to when said fuel cell system is shut down: control said fuel cell system so as to maintain the coupling of said fuel processing assembly to the anode of said fuel cell so as to enable the purging gas which flows through said fuel processing assembly after passing through said fuel processing assembly to be able to flow through said anode of said fuel cell.

15. A fuel cell system in accordance with claim 14 wherein:
said anode oxidizing assembly performs an oxidation reaction and generates an output gas which is coupled as an input to said cathode of said fuel cell.

16. A fuel cell system in accordance with claim 14, wherein:
said fuel processing assembly comprises an input line adapted to receive the input fuel gas and an output line coupled to said anode of said fuel cell;
and said control assembly comprises: a first line connected to said input line of said fuel processing assembly and adapted to receive said purging gas; a first valve connected in said first line, said first valve being opened during shutdown of said fuel cell system; and a second valve connected in said input line of said fuel processing assembly at a point preceding the point at which said first line is connected to said input line of said fuel processing assembly for isolating said fuel processing assembly from components preceding said second valve, said second valve being closed during shutdown of said fuel cell system.

17. A fuel cell system in accordance with claim 16, wherein:
said system further comprises a control valve in said input line of said fuel processing assembly at a point preceding the point at which said second valve is connected in said input line of said fuel processing assembly, said control valve being closed during shutdown of said fuel cell system.

18. A fuel cell system in accordance with claim 17, wherein:
said control assembly during normal operation of said fuel cell system controls said second valve and said control valve to be opened and said first valve to be closed; and
said control assembly during shutdown of said fuel cell system controls said second valve and said control valve to be closed and said first valve to be opened.

19. A fuel cell system in accordance with claim 18, wherein:
said first and second valves and said control valve comprise solenoid valves;
said purging gas comprises nitrogen; and
said fuel processing assembly is adapted to receive water from a water supply.

20. A fuel cell system in accordance with claim 18, wherein:
said anode oxidizing assembly performs an oxidation reaction and generates an output gas which is coupled as an input to said cathode of said fuel cell.

21. A fuel cell system in accordance with claim 20, wherein:
said control assembly responds to restart of said fuel cell system during which said oxidant gas begins to be again received by said fuel cell system and sometime thereafter said fuel gas begins to be again received by said fuel cell system, said control assembly further: from restart of said fuel cell system until when said fuel gas flows at a predetermined level in said fuel cell system, controlling said fuel cell system so as to enable a reducing cover gas containing carbon dioxide to be able flow through said anode of said fuel cell.

22. A fuel cell system in accordance with claim 21, wherein:
said control assembly further comprises: a second line connected to said output line of said fuel processing assembly; and a third valve in said second line, said third valve being opened from restart of said fuel cell system until when said fuel gas flows at said predetermined level in said fuel cell system.

23. A fuel cell system in accordance with claim 22, wherein:
said first, second and third valves and said control valve comprise solenoid valves;
said reducing gas comprises nitrogen;
said first assembly is adapted to receive water from a water supply; and
said reducing cover gas contains hydrogen.

24. A fuel cell system in accordance with claim 14, wherein:
said anode oxidizing assembly is adapted to perform an oxidation reaction and to generate an output gas which is coupled as an input to said cathode of said fuel cell; and
said control assembly is further adapted to respond to restart of said fuel cell system during which said oxidant gas begins to be again received by said fuel cell system and sometime thereafter said fuel gas begins to be again received by said fuel cell system, said control assembly being further adapted to: from restart of said fuel cell system until when said fuel gas flows at a predetermined level in said fuel cell system, condition said fuel cell system to be enabled to allow a reducing cover gas containing carbon dioxide to be able to flow through said anode of said fuel cell.

25. A fuel cell system in accordance with claim 1, wherein:
said control assembly is further adapted to respond to restart of said fuel cell system during which said oxidant gas begins to be again received by said fuel cell system and sometime thereafter said fuel gas begins to be again received by said fuel cell system, said control assembly being further adapted to: from restart of said fuel cell system until when said fuel gas flows at a predetermined level in said fuel cell system, condition said fuel cell system to be enabled to allow a reducing cover gas containing carbon dioxide to be able to flow through said anode of said fuel cell.

26. A fuel cell system in accordance with claim 1, wherein:
said control assembly is further adapted to when said fuel cell system is shut down:
control said fuel cell system so as to maintain the coupling of said fuel processing assembly and said fuel cell and to enable the purging gas which flows through said fuel processing assembly after passing through said fuel processing assembly to be vented to a vent via a low temperature valve.

27. A fuel cell system in accordance with claim 26, wherein:
said fuel processing assembly comprises an input line adapted to receive the input fuel gas and an output line coupled to said anode of said fuel cell; and
said control assembly further comprises: a first line connected to said output line of said fuel processing assembly and being adapted in length and diameter to allow for venting through said low temperature valve; said low temperature valve being situated in said first line and being opened during shutdown of said fuel cell system; and a vent connected to said first line at a point following said low temperature valve.

28. A fuel cell system in accordance with claim 27, wherein:
said control assembly further comprises: a first valve in said input line and adapted to be closed during shutdown of said fuel cell system; a second line connected to the input line of said fuel processing assembly following said first valve and adapted to receive the purging gas to be passed through said fuel processing assembly; a second valve is said second line adapted to be opened during the shutdown of said fuel cell system; a third line connected to said output line of said fuel processing assembly at a point following said the point at which said first line is connected to said output line of said fuel processing assembly and adapted to receive the purging gas to be passed through said anode of said fuel cell; and a third valve connected in said second line and adapted to be opened during shutdown of said fuel cell system.

29. A fuel cell system in accordance with claim 28, wherein:

said low temperature valve and said first, second and third valves comprise solenoid valves;

said purging gas is nitrogen;

said fuel processing assembly is adapted to receive water from a water supply; and said second and third lines are adapted to receive said purging gas from a common supply.

30. A fuel cell system in accordance with claim 28, wherein:

said anode oxidizing assembly is adapted to perform an oxidation reaction and to generate an output gas which is coupled as an input to said cathode of said fuel cell; and said control assembly is further adapted to respond to restart of said fuel cell system during which said oxidant gas begins to be again received by said fuel cell system and sometime thereafter said fuel gas begins to be again received by said fuel cell system, said control assembly being further adapted to: from restart of said fuel cell system until when said fuel gas flows at a predetermined level in said fuel cell system, condition said fuel cell system to be enabled to allow a reducing cover gas containing carbon dioxide to be able to flow through said anode of said fuel cell.

* * * * *